United States Patent [19]

Tabiichi et al.

[11] 3,794,770

[45] Feb. 26, 1974

[54] COIN TELEPHONE SETS

[75] Inventors: Yukio Tabiichi; Yuichi Yamazaki, both of Tokyo; Yoshiharu Sato, Yokohama; Tsunehiko Suzuki, Isehara, all of Japan

[73] Assignee: Nippon Telegraph and Telephon Public Corporation and Anritsy Electric Company Ltd., both of Tokyo, Japan

[22] Filed: Oct. 18, 1971

[21] Appl. No.: 189,919

[30] Foreign Application Priority Data

Oct. 26, 1970 Japan ............................... 45-93520

[52] U.S. Cl. ............................................. 179/6.3 R

[51] Int. Cl. ............................................ H04m 17/02

[58] Field of Search ........... 179/6.5, 6.31, 6.3 R, 6.4

[56] References Cited

UNITED STATES PATENTS

| | | | |
|---|---|---|---|
| 3,406,256 | 10/1968 | Strommen | 179/6.3 R |
| 3,646,575 | 2/1972 | Heirbaut et al. | 179/6.3 R |

FOREIGN PATENTS OR APPLICATIONS

| | | | |
|---|---|---|---|
| 1,206,187 | 9/1970 | Great Britain | 179/6.4 |

*Primary Examiner*—Thomas W. Brown
*Attorney, Agent, or Firm*—Charles W. Helzer

[57] ABSTRACT

This coin telephone set uses polarity reversal of both a speech current from the central office equipment and a source of rectified alternating current to enable a local call, direct distance dialed call, operator-handled toll call, a delay call or an emergency call by simultaneous use of coins of low value and coins of high value.

9 Claims, 7 Drawing Figures

COIN TELEPHONE SETS

BACKGROUND OF THE INVENTION

This invention relates to a coin telephone set, and more particularly to a coin telephone set capable of performing a local call, a direct dialing long distance call, an operator-handled toll call, an emergency call or a delayed call by the simultaneous use of coins of low value and coins of high value.

In recent years, demands for long distance communications have been increased as a result of the increase in the areas of direct distance dialing calls. Generally, the rate for direct distance dialing is calculated by a periodic pulse metering method so that for a long distance call it is necessary to insert a coin of a predetermined low value (for example 10 yens in Japan) for eabh predetermined interval, several seconds for example. Since a conventional coin telephone set permits use of only one type of low value coin it is troublesome to consecutively insert additional coins for the purpose of continuing the speech. In addition, before commencing a long distance call, the user is required to prepare beforehand a number of low value coins.

SUMMARY OF THE INVENTION

Accordingly, it is the principal object of this invention to provide an improved coin telephone set capable of eliminating the disadvantages described above.

Another object of this invention is to provide a coin telephone set wherein polarity reversal of both a speech current sent from a central office equipment and a local source of energizing potential obtained by rectifying a commercial alternating current, are utilized in order to enable a local call, a direct dialing long distance call, an operator-handled toll call, a delayed call and an emergency call by the use of either coins of low value or coins of high value.

Another object of this invention is to provide an improved coin telephone set wherein the polarity reversal of both a speech current sent from a central office equipment and a source provided by rectifying a commercial alternating current are utilized in order to enable a local call, a direct distance dialing call, an operator-handled toll call, a delay call and an emergency call by the simultaneous use of coins of low value and coins of high value and wherein coins of low value are preferentially collected.

Still another object of this invention is to provide a coin telephone set of the type just described wherein the coins are discriminated in accordance with the weight, dimension and configuration thereof and wherein the accuracy of discrimination is improved by electrically discriminating the material of the coins of high value.

Yet another object of this invention is to provide an improved coin telephone set wherein, coins of high value inserted for a direct distance dialing call, result in the production of a number of coin collect signals sent from the central office equipment sufficient to permit a speech for an interval corresponding to the high value coin inserted.

According to this invention there is provided a coin telephone set of the type utilizing polarity reversal of both the speech current sent from a central office equipment and a local source of supply potential provided by rectifying a commercial alternating current for enabling a local call, a direct distance dialing call, an operator-handled toll call, a delay call and an emergency call, characterized in that the coin telephone set comprises means for discriminating low value coins inserted into the telephone set, a first storage means for storing normal low value coins discriminated by the low value coins discriminating means for collecting and returning the low value coins stored in the first storage means, means for discriminating high value coins inserted into the coin telephone set, a second storage means for storing normal high value coins discriminated by the high value coin discriminating means, means for collecting and returning the high value coins stored in the second storage means, detecting means for detecting the presence or absence of the coins in the first and second storage means, the detecting means establishing the speech circuit when low value and/or high value coins are present in the first and or second storage means, coin collect signal receiving means adapted to receive a coin collect signal transmitted from the central office equipment in response to a called party taking his handset off the hook, speech discriminating means which discriminates the type of the call in accordance with the type of the coin collect signal, and control means responsive to the signals from the detecting means, from the coin collect signal receiving means and from the speech discriminating means for controlling the low value coin collecting and returning means and the high value coin collecting and returning means so as to collect and return (if necessary) the inserted coins and to determine the order of preference between the low value and high value coin collecting operations.

BRIEF DESCRIPTION OF THE DRAWINGS

Further objects and advantages of the invention will be understood from the following detailed description when considered in conjunction with the accompanying drawings in which.

DESCRIPTION OF THE PREFERRED EMBODIMENT

For the purpose of illustration, in the following description, it is assumed that the low value coins are 10 yen Japanese coins and that high value coins are 100 yen Japanses coins, although it is believed obvious that other value coins or coins of differenct currencies such as 10 cents and 25 cents in U.S. currency could be used.

Figure 1:
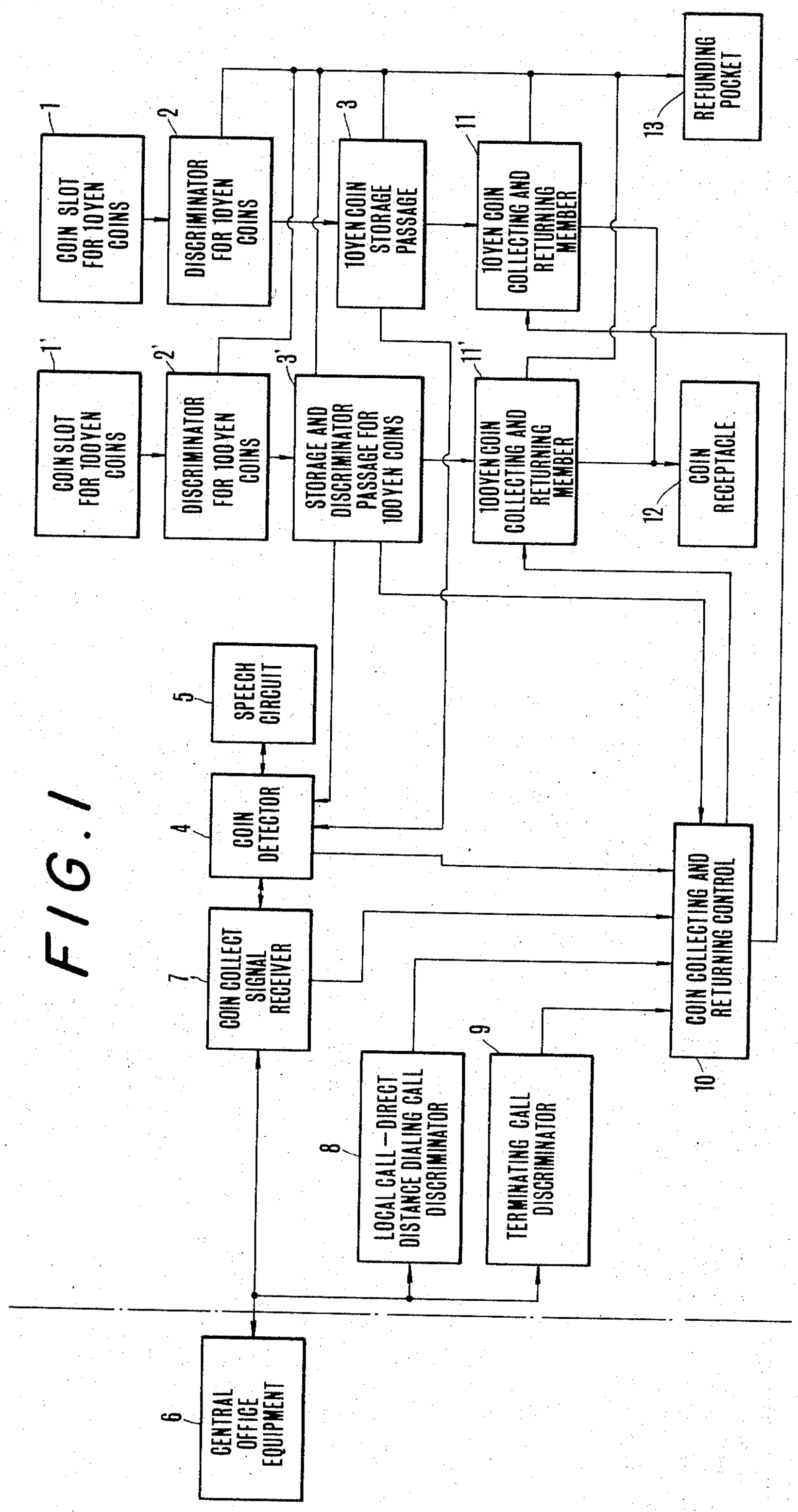
FIG. 1 shows a simplified block diagram of a coin telephone set embodying the invention.

FIG. 1 illustrates a simplified block diagram of a novel coin telephone set according to the invention wherein there are shown coin slots 1 and 1' for 10 yen coins and 100 yen coins, respectively, a discriminator 2 for discriminating the dimension, configuration and weight of the 10 yen coins, a discriminator 2' for discriminating the dimension, configuration and weight of the 100 yen coins and for storing the discriminated normal or prescribed coins, and a detector 4 for detecting the presence or absence of the coins inserted and stored. There are also provided a speech circuit 5, central office equipment 6, a circuit 7 for receiving the coin collect signals sent from the central office equipment 6, a discriminator 8 for discriminating the local call (including the operator-handled toll call) and the direct distance dialing call in accordance with the difference in the types of the coin collect signals, a discriminator 9 for discriminating the terminating call, a circuit 10 for controlling collecting and returning operations for the coins, a collecting and returning member 11 for 10 yen coins, a collecting and returning member 11' for 100 yen coins, a coin receptacle 12 and a coin refurnding pocket 13. The operation of the respective component elements comprising the system shown in FIG. 1 together with their interrelationship will be discussed hereafter.

When a 10 yen coin is inserted into slot 1 after removal of a hand transmitter-receiver from a coin operated telephone set, coin discriminator 2 operates to descriminate whether the inserted coin is a genuine or normal one or a counterfeit one and genuine coins temporarily are stored in coin storage passage 3. An unsuitable or a counterfeit coin is sent to refunding pocket 13 from coin discriminator 2. When the normal coin arrives at the coin storage passage 3, detector 4 for detecting the presence or absence of inserted coins, operates to establish speech circuit 5 for energizing the central office equipment 6 via a subscriber line (not shown). When sending of dial impulses is terminated, a connection is established to a called party, and when the called party responds, coin collect signals are sent out from the central office equipment 6 which are received by coin collect signal receiver 7. The difference between the types of the coin collect signals is discriminated by local call-direct long distance dialing call discriminator 8 to operate the coin collecting and returning member 11 via coin collecting and returning control 10 thus sending the coin to the coin storage receptacle 12.

When a 100 yen coin is inserted in slot 1', the coin is discriminated by coin discriminator 2' in the same manner as has been described in connection with the 10 yen coin and when the inserted coin has predetermined dimension, configuration and weight, the coin is advanced to coin storage passage 3' where its material is discriminated electrically. Coins of the predetermined matrial are temporarily stored in passage 3'. Coins determined as counterfeit or inproper ones by coin discriminator 2', are sent directly to refunding pocket 13 whereas those determined as improper ones by the action of coin discriminator 2' are sent to refunding pocket 13 by the action of coin collecting and returning member 11' under control of coin collecting and returning control 10.

When normal coins are collected in coin discriminating and storage passage 3', circuit 4 for detecting the presence or absence of the coin operates to establish speech circuit 5 through coin collecting and returning control 10 thus energizing the central office equipment 6 through the subscribers line. Thereafter the connection is completed in the same manner as in the case of the 10 yen coin and when the called party responds, coin collect signals are transmitted form the central office equipment 6. Upon receipt of the coin collect signals by coin collect signal receiver, the local call-direct long distance dialing call discriminator 8 functions to discriminate the difference in the types of the coin collect signals and operates coin collecting and returning member 11' through coin collecting and returning control 10 to collect the coin in coin receptacle 12. In the case of a direct long distance dialing call, the coin collect signals which are transmitted from the central office equipment 6 during speech (these collect signals are transmitted at each speech interval corresponding to 10 yens) are received by coin collect signal receiver 7 and are counter by coin collecting and returning control 10 and the speech is permitted to continue until 10 coin collect signals are receved without collecting successive coins.

Figure 2:
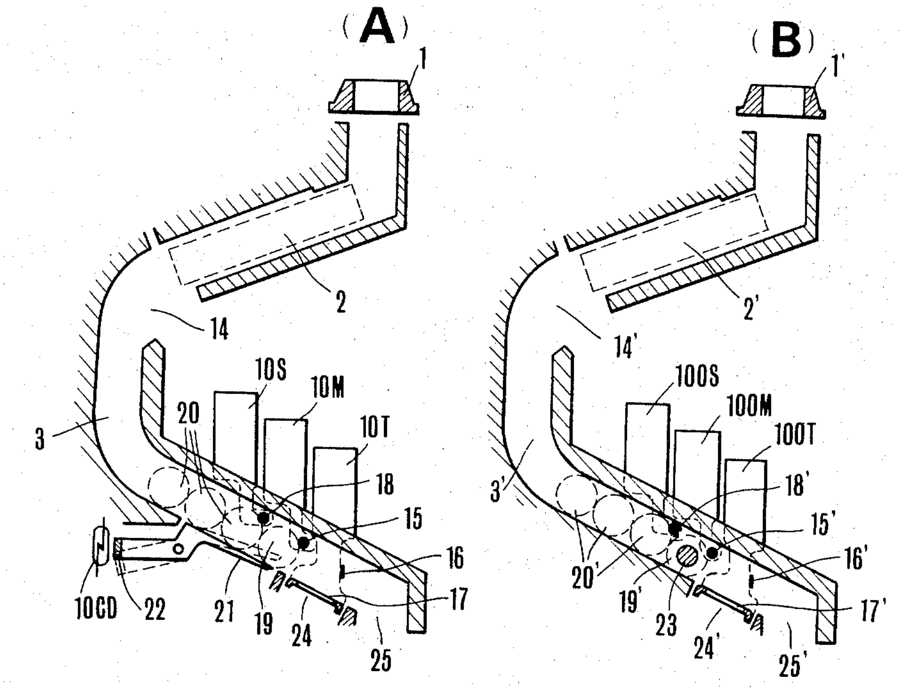
FIG. 2A is a diagrammatic representation of a coin storage means for low value coins and a coin collecting and returning member.
FIG. 2B is a diagrammatic representation of a coin storage means for high value coins and a coin collecting and returning member associated therewith.

FIG. 2 shows the construction of a coin collecting and returning member utilized in the novel coin telephone set, in which FIG. 2A shows the coin collecting and returning member for 10 yen coins while FIG. 2B that for 100 yen coins. As shown in these figures the coin collecting and returning members are provided with electromagnets 10 M and 100 M for temporarily stopping or arresting the inserted coins, electromagnets 10 T and 100 T for stopping the movement of succeeding coins while preceding coins are being processed coin slots 1 and 1', coin discriminators 2 and 2' for discriminating the dimensions, configurations and weights of the coins, coin storage passages 3 and 3', overflow mechanisms 14 and 14' which return surplus coins when additional coins are inserted after a predetermined number of coins have been collected in the storage passages. There are also provided stopper 15 and 15' which are operated by electromagnets 10 M and 100 M, respectively, to temporary stop the inserted coins, coin returning stopper 16 and 16' interlocked with electromagnets 10 T and 100 T respectively, coin collecting stopper 17 and 17' interlocked with electromagnets 10 T and 100 T, respectively, and stopper 18 and 18' interlocked with electromagnets 10 S and 100 S, respectively, for preventing rolling movement of the coins in the manner described hereinafter. The coins firstly inserted are denoted by reference numerals 19 and 19' and the coins secondly inserted are by 20 and 20'. The coin collecitng and returning member for 10 yen coins is provided with a lever 21 actuated by the coins The lever 21 carries a permanent magnet at one end thereof for actuating a reed switch 10 CD. The coin collecting and returning member for 100 yen coins is provided with an electromagnetic sensing coil 23 for detecting unsuitable coins having the same dimension, configuration and weight, but made of different material. Predetermined or normal coins are directed into coins collecting passages 24 and 24' while unsuitable coins are directed into coin returning passages 25 and 25' respectively.

The coin collecting and returning operation of 10 yen coins are performed in the following manner. When a handset is lifted off its hook the electromagnet 10 M is energized to cause stopper 15 to project into the coin passage for preventing the coins from rolling past that point. Accordingly, the first coin inserted will be arrested by stoper 15 and temporarily will prevent rolling movement of succeeding coins past stopper 15 while the first coin 19 is being processed. Collecting op eration of the coins is performed by energizing electromagnets 10 T and 10 S and deenergizing electromagnet 10 M. Energization of electromagnet 10 T causes coin returning stopper 16 to project into coin returning passage 25 for preventing the first coin 10 from being returned and also retracts coin collecting stopper 17 from the coin storage passage thus opening coin collecting passage 24. Deenergization of 10 M retracts stopper 15, the first coin 19 is collected in the coin receptacle 12 via coin collecting passage 24. Energization of electromagnet 10 S causes stopper 18 to project into the coin storage passage to stop rolling movement of the second and succeeding coins 20 during the above-described operation. Upon completion of the coin collecting operation, electromagnet 10 M again is energized and electromagnets 10 S and 10 T are deenergized. Accordingly, stopper 15 interlocked with electromagnet 10 M is projected into the coin storage passage and stopper 18 interlocked with electromagnet 10 S is retracted from the coin storage passage. Thus, the second and succeeding coils roll sequentially to reach stopper 15 if a bad coin is detected, coin returning stopper 16 interlocked with electromagnet 10 T is retracted from coin returning passage 25 and coin collecting stopper 17 is projected into the coin storage passage to close the coin collecting passage 24 and allow the bad coin to be diverted to passage 25. To return a coin that has been inserted but not yet collected, all electromagnets are deenergized to permit the coin to roll into the coin returning passage 25. Similar coin collecting and returning operations are also performed for 100 yen coins.

Figure 3A:
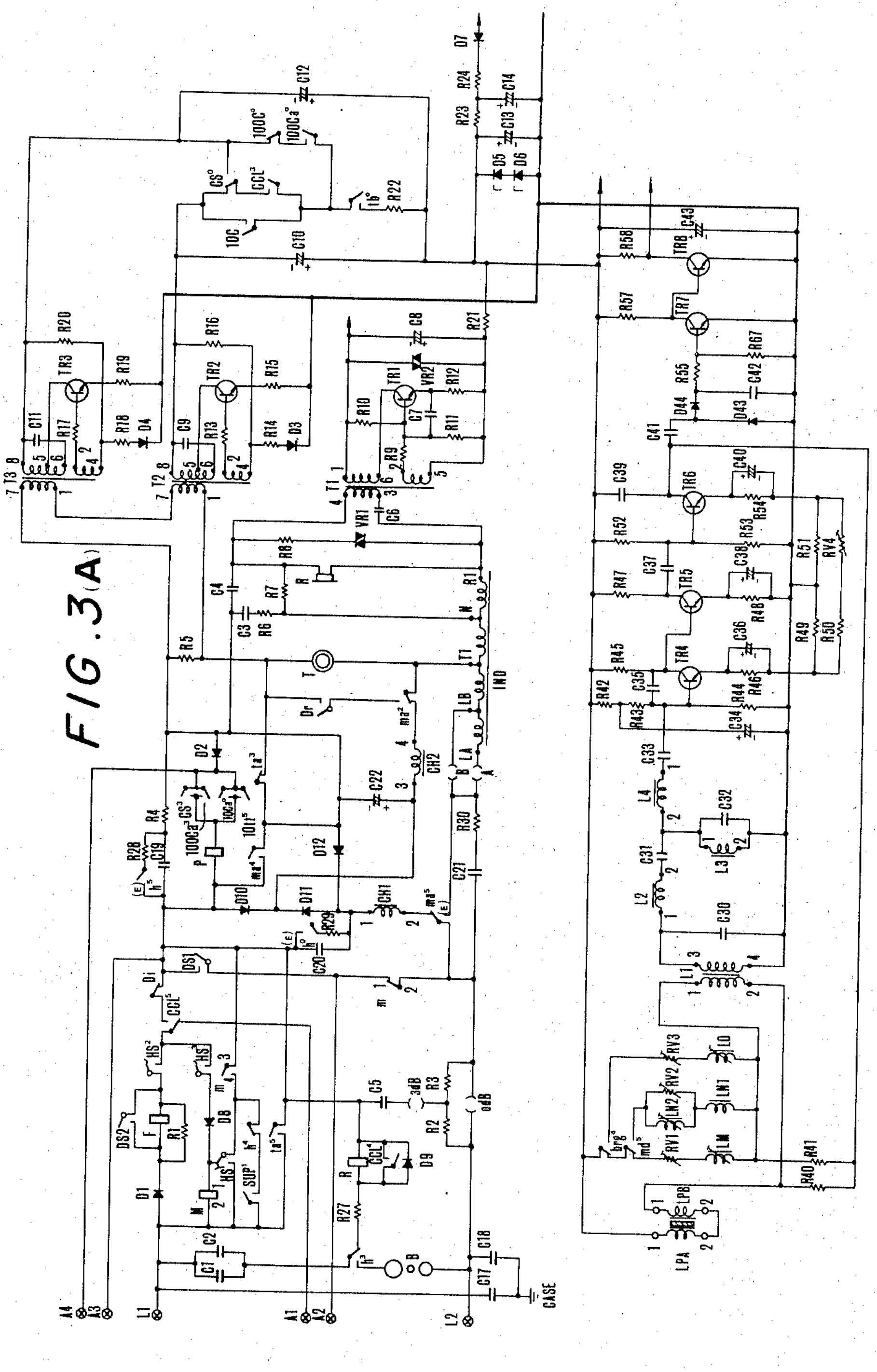
FIGS. 3A and 3B, when combined, represent a detailed schematic electric circuit diagram of a coin telephone set constructed in accordance with the invention.
Figure 3:
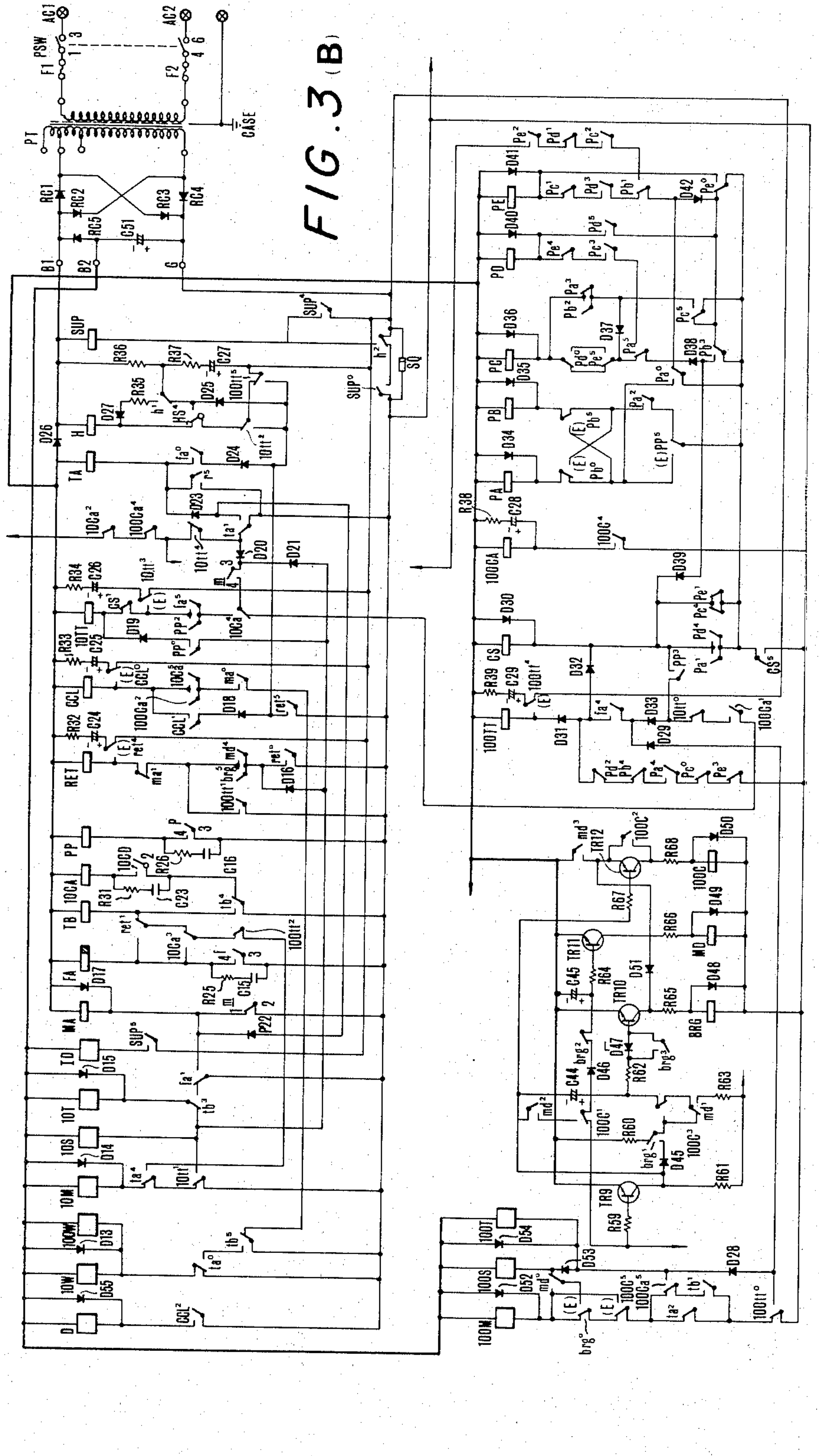

The combination of FIGS. 3A and 3B show a circuit for controlling the speech and coin disposal of the novel coin telephone set. The operations for various types of calls will be described hereunder with reference to FIGS. 2 to 6.

Figure 4:
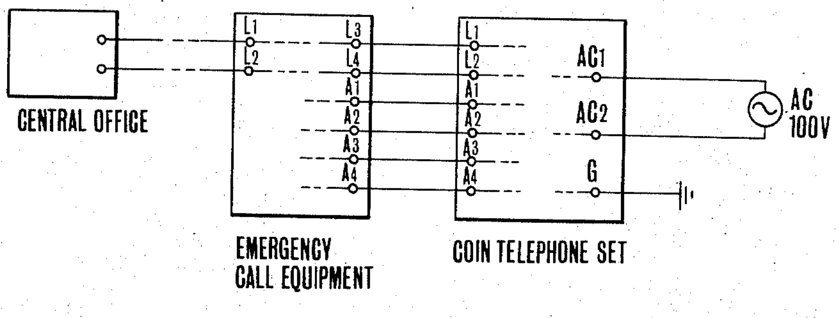
FIG. 4 is a functional block diagram illustrating connections between a telephone exchange and a coin telephone set.

Terminals L1· L2· A1[1]A2· A3 and A4 shown in FIG. 3A are connected to the central office equipment 6 through an emergency cell equipment located outside the coin telephone set and through a subscribers line as shown in FIG. 4. Terminals AC1 and AC 2 shown in FIG. 3B are connected to a commercial AC source, as shown in FIG. 4. FIGS. 3A and 3B show the state of the circuit when a handset is still on the hook and before a source switch PSW is closed which occurs upon the handset being removed from the hook. Upon closure of this switch, when the handset is lifted off this hook, a DC voltage is provided across terminals B1 and G and across terminals B2 and G through a source transformer PT, rectifiers RC1 through RC5 and a smoothing capacitor C51. As a result, a relay H is energized through a circuit extending from terminal G to terminal B1 via a contact 100 $tt^5$, a contact 10 $tt^2$, and a hook switch contact $HS^4$ to close its contact $h^2$ for energizing a relay SUP. This relay continues its operation after deenergization of relay H through its self-holding contact $SUP^4$. Operation of relay SUP operates and electromagnet ID for a power-off indicato through a circuit that can be traced from terminal G via contact $SUP^5$ and electromanet ID to terminal B2. Relay H cooperates with the hook switch to prevent improper operation of various relays and electromagnets caused by abnormal operation of the telephone receiver hook and to control the supply of power to the control circuit. The purpose of relay SUP is to supervise the power source so as to reset various relays and electromagnets of the control circuit for opening the coin passage an to return inserted and stored coins when the AC supply is interrupted. The electromagnet ID is provided to operate the power-off indicator. This electromagnet is reset when the AC supply is interrupted to indicate to the user that the telephone set is inoperable.

I. Local Call

When the handset is taken off the hook, contacts $HS^1$ through $HS^4$ interlocked with the hook switch are operated to reset relay H by contact $HS^4$. Accordingly, control relays and electromagnets are connected to the source via contacts $h^2$ and $SUP^0$. Resetting of contact $h^2$ establishes the following circuit for electromagnets 1OM, 100M, 10W and 100W, and relay MA.

Terminal G—contact $h^2$—contact $SUP^0$—
—contact $10tt^1$—contact $ta^4$—electromagnet 10M—terminal B2
—contact 100 $tt^0$—contact $ta^2$—contact $100C^5$—contact $brg^0$—
—electromagnet 100M—terminal B2
—contact $ta^0$—[—electromagnet 100W— / —electromagnet 100W—]—terminal B2
—contact $m^{1,2}$—relay MA—diode D26—terminal B1

Operation of electromagnets 10W and 100W operates a flapper, not shown, located immediately below the coin slot and a wiper of a coin selecting track to form the coin passage. Further, operaton of electromagnets 10 M and 100 M retians the inserted coin at one end of the coin storage passage. Relay MA operated by the above described circuit acts as an auxiliary relay for a called party off-hook supervisory relay M for decreasing the loop resistance of the speech circuit in the telephone set until the called party takes his receiver off the hook thus assuring connecting operation.

When a 10 yen coin is inserted, the coin is brought onto lever 21 (FIG. 2) by the action of stopper 15 (FIg. 2) for preventing rolling of the coin, which is interlocked with electromagnet 10M at the end of the coin storage passage. Then the lever 21 is rotated by the weight of the coin to close reed switch 10 CD by the action of permanent magnet 22 (FIG. 2) mounted on the outer end of lever 21 thereby successively operating relays 10 CA and CCL by the following Terminal G—contact $h^2$—contact $sup^0$—contact $tb^4$—
—reed switch 10CD—relay 10 CA—diode D26—terminal B1,
Terminal G—contact $h^2$—contact $sup^0$—contact $tb^5$—
—contact $ma^0$—contact 10 $ca^5$—relay CCL—diode D26—
—terminal B1.

Relay 10 CA operates as an auxiliary relay for reed switch 10 CD to detect the pressence and absence of the inserted and stored coin. On the other hand, relay CCL functions to discriminate the coin inserted at the time of signal transmission to establish the following speech circuit for energizing the central office equipment, thereby energizing relay in FIG. 3A by the current flowing through its loop circuit.

Terminal L1—diode D1—[relay F / resistor R1]—contact $HS^2$—
—contact $ccl^5$—contact Di—contact $ma^4$—contact $ta^3$—
—transmitter T—induction coil IND—[tap A / tap B]—contact $ma^5$—
—[resistor R3—resistor R2 / pad odB]—terminal L2

Operation of relay F causes operaton of its auxiliary relay FA. The purpose of relay F is to discriminate between direct distance dialling call and another calls described later by utilizing the slow-release characteristic of its auxiliary relay FA. The dial impulse for connecting the called party is produced by the interrupting action of a dial impulse contact Di and is sent to the central office equipment via following circuit.

Terminal L1—diode D1—contact Ds2—contact $HS^2$—
—contact $CCl^5$—contact Di—contact Ds1—contact $m^{1,2}$—
—[resistor R3—resistor R2 / pad odB]—terminal L2

Figure 5:
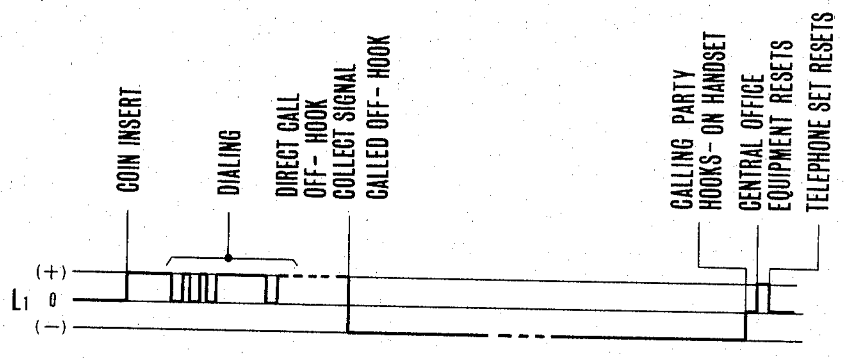
FIGS. 5 and 6 are time vs. voltage wareshape characteristic curves which show polarity reversal of the voltage on a telephone line $L_1$ during an interval between insertion of a coin and termination of a speech.

When the called party responds by taking his handset off the hook (off hook) and upon completion of the connection, a local coin collect signal is received which acts to invert the polarity of the speech current as shown in FIG. 5. More particularly, during an interval between signal transmission and the response of the called party, the polarity of terminal L1 is positive and that of terminal L2 is negative. However, when the called party responds, these polarities are reversed. For this purpose, the called party off-hook supervisory relay M in FIG. 3A is energized by the following circuit.

Terminal L2—[Resistor R2—Resistor R3 / pad odB]—contact $ma^5$—
—[tap A / tap B]—induction coil IND—transmitter T—contact $ta^3$—
—contact $ma^4$—contact Di—contact $ccl^5$—contact $HS^3$—
—diode D8—relay M—terminal L1

Relay M is constructed such that although its winding is short circuited by its contact $m^{3,4}$, it is maintained in the operated condition by the magnetic force. Due to the inversion of the speech current, relay F is reset to open the operating circuit of its auxillary relay FA. However, since auxiliary relay FA has a delay-reset characteristic, once operated, the relay FA is maintained in the operated conditon for a predetermined interval following interruption of its operating circuit. During the interval between the operation of relay M and the resetting of relay FA, the following circuit is established to operate a coin collect control relay 10TT in FIG. 3B.

Terminal G—contact $h^2$—contact $sup^0$—contact $ta^1$—
—diode D20—contact $m^{3,4}$—contact $10ca^4$—contact $fa^5$—
—contact $CS^1$—relay 10TT—diode D26—terminal B1.

When relay 10TT operates, relay TA is operated by the following circuit and is maintained in the operated conditon by a holding circuit including its contact $ta^1$ and diode D23.

Terminal G—contact 100 $tt^5$—contact 10 $tt^2$—contact $fa^0$—
—relay TA—diode D26—terminal B1.

When relay TA operates, its contact $ta^1$ interrupts the operating circuit for relay 10II but this relay continues its operation through the following circuit until relay FA resets with a time delay.

Terminal G—contact $h^2$—contact $sup^0$—contact $10tt^1$—
—diode D21—contact $m^{3,4}$—contact $10Ca^4$—contact $fa^5$—
—contact $CS^1$—relay 10TT—diode D26—terminal B1.

When relay FA resets, the operating circuit of relay 10TT is interrupted so that relay resets with a time constant determined by resistor R34 and capacitor C26. The interval during which relay 10TT is operating is the coin collecting time. During this interval, the operating circuit of electromagnet 10M which was operated at the time of transmitting the signal is interrupted by contact $10tt^1$ so that electromagnet 10M resets and electromagnets 10S and 10T are energized through following circuit to collect one coin.

Terminal G—contact $h^2$—contact $sup^0$—contact $10tt^1$—
—[electromagnet 10S / contact $tb^3$—electromagnet 10T]—terminal B2.

Coins are collected as above described by the operation and resetting of electromagnets 10M, 10S and 10T.

Where there are more than two coins inserted and stored in the coin storage passage, even after the first coin has been collected, the second and following coins are brought onto lever 21 so that reed switch 10CD is energized and relay 10CA operates continuously. Under these conditions, when the collecting operation of the first coin has been completed, and when relay 10TT resets, relay FA is operated again through following circuit.

Terminal G—contact $h^2$—contact $sup^0$—contact 10 $tt^1$—
—contact $ta^4$—contact 100 $tt^2$—contact 10 $Ca^3$—relay FA—
—diode D26—terminal B1

Under these conditions, since all electromagnets 10M, 10S and 10T are reset, the second and following coins which have been retained in the storage passages are allowed to roll into coin returning passage 25 (see FIG. 2) and thence into the refunding pocket 13. When the last coin in the storage passages passes over lever 21, the lever rotates in the counterclockwise direction as viewed in FIG. 2 to successively reset reed switch 10DC and relay 10 CA. This operation does not cause any damage to the user because even when the user inadvertently inserts two or more 10 yen coins (assuming a 10 yen rate for a local call) only one coin is collected and surplus coins are returned to the user. When realy 10 CA resets, its contact switches the energiztion circuit of relay FA thereby operation relay TB, which normally is continuously maintained in the operated condition by its holding contact $tb^4$. After opening the the following operating circuit for electromagnet 10T.

Terminal G—contact $h^2$—contact $sup^0$—contact $fa^1$—
—contact $tb^3$—electromagnet 10T—terminal B2

When electromagnet 10T operates again the coin passage is switched to the coin receptacle and the coins inserted thereafter are directly collected in the coin receptacle without being retained in the coin storage passage. This is because that the passage-handled tool call to be described later and the response signal of the called party of the usual local call are of the same type. The reason that relay FA is designed to complete its time delay resetting before reenergization of electromagnet 10T is to ensure such reenergization of this electromagnet only when the last coin to be returned has actually rolled into coin returning passage 25 (FIG. 2) after leaving lever 21. Thus, it is possible to prevent improper collection or improper return of the coin by the operation of electromagnet 10T. Where the number of coins inserted and stored in the storage passage is only one, the coin leaves lever 21 and is then collected during the operation of relay 10TT so that reed switch 10CE and relay 10CA reset during the operation of relay 10TT. Under these conditions, resetting of relay 10TT does not cause the operation of relay FA but operates directly relay TB thus establishing the energizing circuit for electromagnet 10T in the same manner as above described. In case of a coin being inserted, relay CCL interrupts the self holding cirucit thereof due to the resetting of contact 10 $tt^2$ when two or more coins interrupt the self holding circuit thereof due to the contact 10 $ca^5$. When the self holding is interrupted, the relay CCL will reset slowly witn a time constant determined by resistor R33 and capacitor C25. During the interval between the operation of relay TB and the resetting of relay CCL, a voltage produced by Zener diodes D5, D6 in FIG. 3A is supplied to a 10 yen coin denomination tone oscillator constituted by transformed T2, transistor TR2, capacitor C9 and resistors R13 through R16, through the following circuit.

Resistor R22—contact $tb^0$—contact $ccl^3$—contact $cs^0$—
—coin denomination tone oscillator.

This oscillator oscillates at a predetermined frequency and functions to short circuit capacitor C10 which has been charged beforehand through low resistance resistor R22, thus discharging the capacitor C10. When relay CCL resets, contact $ccl^3$ is opened to connect the discharged capacitor C10 is series with the collector electrode of transistor TR2, thus charging the capacitor. During this charging the oscillator output attenuates exponentially. This is necessary in order to attenuate the output of the coin denomination tone oscillator in the same manner as the conventional oscillator utilizing a tuning fork. The output of the oscillator is impressed across resistor R5 in the speech circuit through transformer T2 and is then transmitted to the operator in the telephone office through the following loop circuit.

Terminal L2—[resistor R2—resistor R3 | pad odB]—contact $ma^5$—
—[tap A | tap B]—induction coil IND—transmitter T—resistor R5—
—contact $ma^4$—contact $m^{3.4}$—[contact HS1 | contact $h^4$—contact $sup^1$] | contact $ta^5$—
—terminal L1.

This signal is not necessary for the local call but is used for the operator-handled toll call as will be described later. However, as has been pointed out hereinbefore, since the operator handled toll call and the response signal of the called party of the usual direct call are of the sam type, the signal is sent out. After completion of the coin collecting operation at the time of response of the called party the speech continues through the loop circuit described above. When the speech is terminated and the handset is placed back on the hook the hook switch is reset and resets its contacts $HS^1$ through $HS^4$ Contact $HS^4$ operates relay H through the following circuit and the contact $h^2$ of relay H interrupts the operating circuits of relays MA, TA and TB and electromagnets 10T and 10W which have been operated during the speech thus resetting these relays and electromagnets.

Terminal G—contact $100tt^6$—contact $10tt^2$—contact $HS^4$—
—relay H—terminal B1.

Consequently, the loop circuit to central office equipment is interrupted so that the equipment is reset to restore the polarity of the speech current such that terminal L1 will assume positive polarity whereas terminal L2 negative polarity. At this time, the called party off-hook supervisory relay M which was operated at the time the hand set was taken off the hook of the called party and has been magnetically maintained in the operating state as above described, will receive from the following circuit a current which flows in a direction to cancel the magnetic flux, whereby the relay M resets immediately.

Terminal L1—relay M—contact $HS^1$—contact $m^{3.4}$—
—diode D10—choke coil CH2—contact $ma^2$—transmitter T—
—contact $ta^3$—diode D12—choke coil CH1—contact $ma^5$—
—[resistor R3—resistor R2 | pad odB]—terminal L2.

When the contact $m^{3.4}$ resets, the above described loop circuit is interrupted and all component elements of the coin telephone set are returned to the original condition.

II. Long Distance Direct Dialing Call

Figure 6:
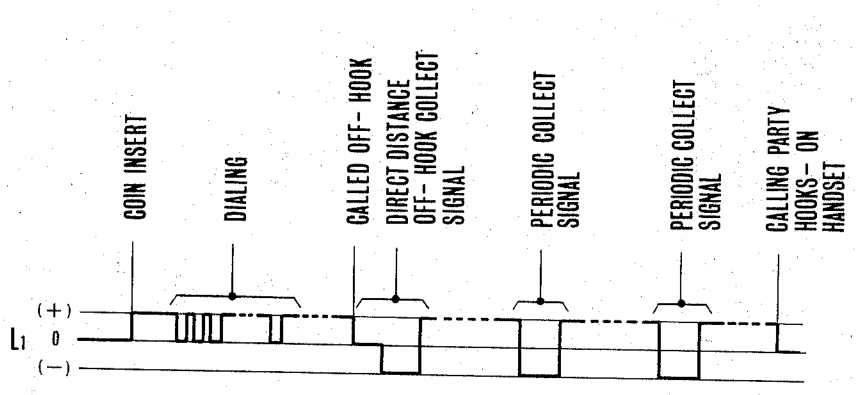

In this case, the operation until the called party responds and takes his hand set off the hook after the calling party has removed his handset from the hook and inserts a 10 yen coin to transmit a dial impulse, is identical to that of the local call described hereinabove. When the called party responds, the central office equipment sends a toll coin collect signal in which the current is interrupted for a definite time interval during which this condition is maintained the polarity is again inverted to the original polarity, as shown in FIG. 6, so as to perform the following operations. More particulary, during the first current interruption, relay F resets and then auxiliary relay FA resets with a time delay. After the no current conditions for the definite interval, the polarity of terminal L2 becomes positive and that of terminal L1 negative for a definite time interval. Under these conditions the called party off-hook supervisory relay M is energized by the same loop circuit as that of the local call. Operation of the relay M resets auxiliary relay MA by opening contact $m^{1.2}$ so that the current sent from the central office equipment (having positive polarity at terminal L2) energizes a coin collect signal receiving relay P through the following circuit.

—resistor R2—resistor R3—
Terminal L2— —contact $ma^5$—
—pad odB—
—choke coil CH1—diode D11—choke coil CH2—contact $ma^2$—
—transmitter T—contact $ta^3$—diode D2—contact 10 $ca^0$—
—contact $HS^1$—
—relay P—contact $m^{3.4}$— —terminal L1
—contact $h^4$—contact $sup^1$—

When relay P is operated, its contact $p^{3.4}$ is FIG. 3B operates auxiliary relay PP so that its contact $pp^2$ energizes coin collect control relay 10TT through the following circuit.

Terminal G—contact $h^2$—contact $sup^0$—contact $ta^1$—
—diode D20—contact $m^{3.4}$—contact $10ca^4$—contact $pp^2$—
—relay 10TT—diode D26—terminal B1.

Although relay 10TT operates, since relay FA has been reset as above described relay TA will not operate. More particularly, when relay 10TT operates, relay TA may operate or not. By utilizing these two conditions, the novel coin telephone set discriminates between the direct distance dialing call and other types of calls.

Thus:

Direct distance dialling call :
  when relay 10TT operates
  relay TA resets
other calls :
  when relay 10TT operates
  relay TA operates When relay 10TT operates, its contact $10tt^1$ resets electromagnet 10M and operates electromagnets 10S and 10T, thus collecting one coin. When only one coin is inserted, the coin is collected by the operation described above and the coin operated lever 21 (FIG. 2) resets so that reed switch 10CD and hence relay 10CA reset.

However, during the interval in which the signal arrives at terminal L2 and its polarity is positive, the operation of relay 10TT is continued by the contact of relay P to establish the loop circuit to the central office equipment through contact 10 $tt^5$. Further, during an interval wherein relay 10 CA is reset and relay 10TT is operating voltage is supplied from the source to an oscillator or a coin requesting tone oscillator comprising transformer T1, transistor TR1, resistors R9 through R12 and capacitor C7. This oscillator operates at a predetermined frequency to send out the request signal tone to receiver R included in the speech circuit through capacitor C6. The purpose of this signal tone is to inform the user that all coins inserted and stored have been collected. This is because the telephone set of this invention is of the pre-paying system. According to this system a telephone rate for a speech time which is determined by the distance to the called party in accordance with the periodic pulse metering method should be collected before commencement of the speech thus permitting speech until the next coin collect signal is received. Upon termination of the toll coin collect signal the polarity of the speech current is again inverted to make the polarity of terminal L1 positive and that of terminal L2 negative so as to establish the speech path as follows. At this time, relay P is deenergized to reset so that relay 1TT also resets with a time delay.

—contact $HS^1$—
Terminal L1— —contact $m^{3.4}$—diode D10—
—contact $sup^1$—contact $h^4$—
—choke coil CH2—contact $ma^2$—transmitter T—contact $ta^3$—
—diode D12—choke coil CH1—contact $ma^5$—
—resistor R3—resistor R2—
— —terminal L2.
—pad odB—

Thereafter the speech is continued under these conditions and if a coin is inserted and stored when a periodic coin collect signal occurs (see FIG. 6) that is the next coin collect signal is supplied by the periodic pulse metering method, reed switch 10CD and relay 10CA would have been operated so that relay P will be operated by the same operating circuit as above described to cause successive operations of relays PP and 10TT, thus collecting one coin. If there is no coin stored at the time of arrival of the coin collect signal, reed switch 10CD and relay 10CA will reset so that the operating circuit of relay P will be interrupted by contact 10 $ca^0$ at the time when the coin collect signal arrives, thus deenergizing relay P. Consequently, during the interval in which the coin collect signal is received the loop circuit to the central office equipment will not be established if no coin has been stored. The central office equipment detects this condition and interrupts the speech circuit for the called party thereby restoring the original direction of the speech current for the novel telephone system (the polarity of terminal L1 becomes positive). Under these circumstances, the above described speech circuit is established to transmit an audible busy-signal to inform to the calling party the fact that the speech has been interrupted. Where a plurality of coins have been inserted, one of them is collected when the called party responds and than remaining coins are successively collected each time a coin collect signal is supplied according to the periodic pulse metering method. When the last coin is collected, a coin requesting signal tone is sent out as above described, and if the user inserts an additional coin before he receives the next coin collect signal he can continue his speech. In the absence of additional inserted coin, the speech circuit will be interrupted as above described.

The operation of the coin telephone set when a 100 yen coin is inserted is as follows :

The portion of the operation identical to that of the case of 10 yen coin is not described again. The inserted coin passes through discriminator 2' (FIG. 2) for discriminating the dimension, configuration and weight of the coin and is then temporarily retained at one end of the coin storage passage by the operation of stopper 15' interlocked with electromagnet 100M, where the material of the coin is examined to determined whether the coin is a genuine coin or a counterfeit coin. Thus when the coin is brought to face sensing coil 23 (FIG. 2), the impedance of the coil varies in accordance with the material to cause unbalance of a bridge circuit shown in the lower half of FIG. 3A consisting of electromagnetic sensing coils LPA and LPB, resistors R40 and R41, coil LM, resistor PVi, contact $md^5$ and contact $brg^4$.

The voltage produced by the unbalance of the bridge circuit is applied through transformed L1 and a filter to an amplifier comprised by transistors TR4 to TR6 and the amplified voltage is supplied to transistor TR7 through a rectifying circuit to turn ON transistor TR7. Turn-on of transistor TR 7 turns transistor TR8 OFF and transistor TR11 shown on the lower half of FIG. 3B turns ON to operate relay MD which detects that an article having the same dimension, configuration and weight as a predetermined or normal coin has been inserted. Operation of relay MD switches one arm of the bridge circuit to establish the following circuit Electromagnetic sensing coils LPA and LPB—resistors R40 and resistor—R41—coil LN1—[coil LN2 / resistor RV2]—contact md$^5$—contact brg$^4$ When the bridge circuit becomes balanced, transistor TR7 is rendered OFF by the circuit described above. This causes transistor TR8 ON, transistor TR9 OFF and transistor TR12 ON thereby operating relay 100C. On the other hand, when the bridge circulation continues unbalanced, transistor TR7 is still maintained ON, transistor TR8 OFF and transistor TR9 ON so that transistor TR12 is maintained OFF. In other words, relay 100C will not be operated. At this time, previously operated relay MD truns ON transistor TR10 after a predetermined time through the following circuit.

Source (+)—resistor R63—contact md$^1$—contact 100 C$^3$—resistor R62—Zener diode D47—transistor TR10—source (−)

Then relay BRG is operated to again switch one arm of the bridge circuit to establish the following circuit.

Electromagnetic sensing coils LPA and LPB—resistor R40—resistor R41—coil LO—resistor RV3—contact brg$^4$ When the bridge becomes balanced, transistor TR12 is rendered ON to operated relay 100C in the same manner as above described. If the unbalanced condition persists, the inserted coin is determined as a unsuitable coin and after the time delay resetting of relay MD, the following circuit is established to deenergize electromagnet 100M and to energize electromagnet 100S thus returning the unsuitable coin.

Terminal G—contact h$^2$—contact sup$^0$—contact 100 tt$^0$—contact ta$^2$—contact 100C$^5$—contact brg$^0$—contact md$^0$—electromagnet 100S—terminal B2

Two switchings of the bridge circuit described above is necessary where there are two types of 100 yen coins,one made of nickel and the other silver. Accordingly, where there is only one type of 100 yen coin, it is necessary to switch the bridge circuit only once and the provision of relay BRG is not necessary.

After finishing the material discrimination of the 100 yen coins relay 100C operates to successively operate relays 100CA and CCL by the following circuits in the same manner as above described.

Terminal G—contact h$^2$—contact sup$^0$—contact 100C$^4$—relay 100CA—diode D26—terminal B1.

Terminal G—contact h$^2$—contact sup$^0$—contact tb$^5$—contact ma$^0$—contact 100 ca$^2$—relay CCL—diode D26—terminal B1.

Operation of relay CCL establishes the same speech circuit as the local call to start the central office equipment for operating relay F by the loop current. The operation performed during the interval between the response of the called party and the operation of relay PP is the same as the direct distance dialing call using 10 yen coins. Operation of relay PP establishes the following circuit for operating count control relay CS and count relay PA.

Terminal G—contact h$^2$—contact sup$^0$—contact ta$^1$—diode D20—contact $m^{3.4}$—contact 10ca$^4$—contact 100ca$^1$—contact 10tt$^0$—contact pp$^3$—[relay CS—diode D26—terminal B1 / [contact pc$^4$ / contact pe$^1$]—contact pp$^5$—relay PA—diode D26—terminal B1]

When relay PA operates the coin collect control relay 100TT is operated by the following circuit to deenergize electromagnet 100M and to energize electromagnets 100S and 100T by its contact 100 $tt^0$ thus collecting one coin.

Terminal G—contact h$^2$—contact sup$^0$—contact pe$^3$—contact PC$^0$—contact pa$^4$—contact pb$^4$—contact pd$^2$—diode D31—relay 100TT—diode D26—terminal B1.

Upon termination of the toll coin collect signal, the polarity of the speech current will become such that terminal L1 becomes positive whereas terminal L2 negative this establishing a speech circuit similar to that of the case of using 10 yen coins. At this time since relay P is deenergized to reset, relay PP resets to operate relay PB in the count circuits through contact $pp^5$ of relay *pp*. The contact $pb^4$ of relay PB interrupts the operating circuit of relay 100TT so that this relay resets with a time delay.

Thereafter, speech can be continued under this condition and each time a periodic collect signal (FIG. 6) according to the periodic pulse metering method is received relay PP is operated to drive the count circuit constituted by relays PA through PE. During an interval in which relays PA and PB of the count circuit are reset by the 10th periodic collect signal a voltage is supplied to the coin request tone oscillator from the source via the following circuit. Accordingly, this oscillator supplies a requesting signal tone to receiver R included in the speech circuit 62 through capacitor C6.

Terminal G—contact $h^2$—contact $sup^0$—contact $CS^5$—
—contact $pa^0$—contact $pb^1$—contact $pc^2$—contact $pd^1$—
—contact $pe^2$—contact $100ca^4$—contact $10ca^2$—coin requesting tone oscillator.

On the other hand, when the 10th periodic coin collect signal is counter, relay CS resets to interrupt supply of power to the count circuit by its contact $CS^5$, thus resetting the count circuit. Where no coin is stored prior to the arrival of the next coin collect signal, both relays 100C and 100 CA will not be operated because the coin material discriminator does not produce any output. Thus, when the coin collect signal arrives, the operating circuit of relay P is interrupted so that this relay becomes inoperative and can not form the loop circuit to the central office equipment. Thus, the speech circuit is forcibly interrupted in the same manner as in the case of 10 yen coins. When coins are inserted and stored, the speech is permitted to continue by collecting the coins by repeating operations similar to those performed when the called party responds.

Let us now consider a case wherein both 10 yen coin and 100 yen coin are inserted. Since contact 10 $ca^4$ is included in the operating circuits for coin collect control relay 10 TT and count control relay CS so long as the 10 yen coin has been inserted and stored, relay 10 TT always operates to preferentially collect the 10 yen coin. When the stored 10 yen coin has been collected, relay 10 *c*A resets to close its contact 10 $Ca^4$ thus forming the operating circuit for relay CS. Accordingly, next coin collect signal is used to collect the 100 yen coin. Even when an additional 10 yen coin is inserted while the count circuit is counting the coin collect signals after completion of the collection of the 100 yen coin, as the operating circuit for relay 10 TT is interrupted by contact $cs^1$, the collection operation of the 10 yen coin will not be performed. But the 10 yen coin is collected by the coin collect signal received after resetting of relay CS.

When the handset is placed back on the hook after termination of the speech or forced interruption thereof, with the polarity of terminal L1 positive, current flows through relay M in a direction to demagnetize it through a circuit similar to that formed at the termination of a local call, so that the relay M resets immediately. Further, like the termination of a local call, relay H is operated by the contact $HS^4$ of the hook switch to reset the relays and electromagnets that have been operated during the speech. If there is any stored coins remaining in the coin storage passage at the termination of the speech, such coins are returned to the refunding pocket when the electromagnets are reset.

III. Operator-Handled Toll Call

Since connecting operations for this type of call are substantially identical to those for the local call, only the difference between time will be described hereunder. In such a call as the operator-handled toll call, even when a coin is inserted and the required connection is completed by dialing and the operator responds, the coin collection operation is not performed because no called party off-hook signal arrives. Thus, the user communicates with the operator under conditions prevailing after completion of the dialing. The speech circuit at this time is as follows.

Terminal L1—diode D1—[relay F / resistor R1]—contact $HS^2$—
—contact $ccl^5$—contact Di—contact $ma^4$—contact $ta^3$—
—transmitter T—induction coil IND—[tap A / tap B]—
—contact $ma^5$—[resistor R3—resistor R2 / pad odB]—terminal L2

When the operator completes the connection on the called party, a coin collect signal is transmitted to the calling party. This signal is the same as that produced when the called party responds at the time of the local call so that the coin collecting operation of the coin telephone set is the same as that of the local call. Thereafter, when the operator informs the calling party of the telephone fair determined according to the distance to the called party, the calling party inserts coins of the amount specified. When 10 yen coins are inserted, a coin operated contact 10C (not shown in the drawing) located at the entrance of the coin storage passage is operated to collect the coins in the coin receptacle. This contact 10C operates the coin denomination tone oscillator (for 10 yen coins) which has been described above in connection with the operation of the local call to transmit a signal to the operator in the central office indicating that 10 yen coins have been collected. The coin denomination tone is transmitted for each coin thus enabling the operator to affirm the number of coins collected. In the case of a 100 yen coin, it is arrested temporarily by stopper 15' (see FIG. 2B) located at the end of the coin storage passage. Only when the coin is determined as a genuine or normal coin by the operation of the coin material discriminator electromagnet 100M is reset and electromagnets 100S and 100T are operated to collect the coin by the following circuit.

Terminal G—contact $h^2$—contact $sup^0$—contact $100tt^0$—
—terminal $tb^1$—contact $100ca^5$—[diode D53—electromagnet 100S / electromagnet 100T]—
—terminal B2

During this coin collecting oeration and during the interval between the resetting of relay 100C and the resetting of relay 100 CA, a source constituted by Zener diodes D5 and D6 is connected through the following circuit to a coin denomination tone oscillator for 100 yen coins constituted by transformer T3, transistor TR3, capacitor C11 and resistors R17 to R20 inclusive.

Resistor R22—contact $tb^0$—contact 100 $ca^0$—contact 100$C^0$—
—coin denomination tone oscillator.

Like the coin denomination tone oscillator for 10 yen coins, this oscillator operates at a peredetemined frequency and short circuits opposite terminals of charged capacitor C12 via low resistance resistor R22, thus discharging the capacitor. When relay 100CA resets to open its contact 100 $ca^0$ the discharged capacitor C12 is connected in series with the collector circuit of transistor TR3 to be charged. During this charging, the oscillator output decreases exponentially. These operations are repeated for each coin inserted so that the operator can confirm the number of 100 yen coins collected. Thereafter, operations proceed in the same manner as the local call during speech and after termination thereof.

IV. Delayed Call

When the operator calls the coin telephone set a ringing signal of 16 $H_z$ is sent from the central office equipment to operate a electric bell by the following circuit.

Terminal L1—capacitors C1 and C2—contact $h^3$—electric bell B—
—terminal L2.

When the calling party takes the handset off the hook (hooks-off) the contact $HS^4$ of the hook-switch resets relay H to perform the same operation as the called party removing his hand set from the hook in the case of the local call. In addition, since contact $h^3$ resets, the ringing signal of 16 $H_z$ operates relay R during the positive half cycles of alternating current supplied to terminal L2. The ringing circuit is as follows.

Terminal L2—[resistor R2—resistor R3 / pad odB]—contact $ma^5$—
—[tap A / tap B]—induction coil IND—transmitter T—contact $ta^3$—
—contact $ma^4$—relay R—resistor R27—contact $h^3$—
—capacitors C1 and C2—terminal L1.

When relay R operates, its contact $r^5$ closes following the operating circuit for relay TA which is maintained in the operated state by its self-holding contact $ta^1$ Terminal G—contact $h^2$—contact $sup^0$—contact $r^5$—relay TA—
—diode D26—terminal B1.

Further, operation of relay TA established the following speech circuit thus enabling communication.

Terminal L1—contact $ta^5$—contact $ma^4$—resistor R6—
—transmitter T—induction coil IND—[tap A / tap B]—
—contact $ma^5$—[resistor R3—resistor R2 / pad odB]—terminal L2.

In the delay call since no coin is inserted beforehand relays 10CA and 100CA do not operate and the operation of relay TA establishes the following operating circuit for relay TB which is maintained in the operated state by its self-holding contact $tb^4$.

Terminal G—contact $h^2$—contact $sup^0$—contact $10tt^1$—
—contact $ta^4$—contact 100 $tt^2$—contact $10ca^3$—contact $ret^1$—
—relay TB—diode D26—terminal B1.

When relay TB operates, its contact $tb^3$ establishes following operating circuit for electromagnet 10T.

Terminal G—contact $h^2$—contact $sup^0$—contact $fa^1$—
—contact $tb^3$—electromagnet 10T—terminal B2.

The 10 yen coin inserted by the user in accordance with the information given by the operator functions to operate the coin denomination tone oscillator through contact 10C as a result of the operation of electromagnet 10T and the coin is collected directly in the coin receptacle as in the case of the operator-handled toll call. Where a 100 yen coin is inserted, when relay TB operates, its contact $tb^1$ establishes following operating circuit for electromagnet 100M so that the coin is temporarily stopped by stopper 15' (FIG. 2).

Terminal G—contact $h^2$—contact $sup^0$—contact 100 $tt^0$—contact $tb^1$—
—contact 100 $ca^6$—contact $100c^6$—contact $brg^0$—electromagnet 100M—
—terminal B2.

Thereafter, when the coin material discriminator determines that the inserted coin is a genuine or normal coin, the coin is collected in the coin receptacle in the same manner as has been described in connection with the operator-handled toll call. Upon termination of the speech, as the user hangs his handset on the hook, the contact $HS^4$ of the hook switch is reset and relay H operates to interrupt the operating circuits for various relays and electromagnets by opening its contact $H^2$. Thus, all relays and electromagnets that have been operated are reset. The speech circuit too is interrupted and the coin telephone set restored its normal state.

V. Emergency Call

Figure 7:
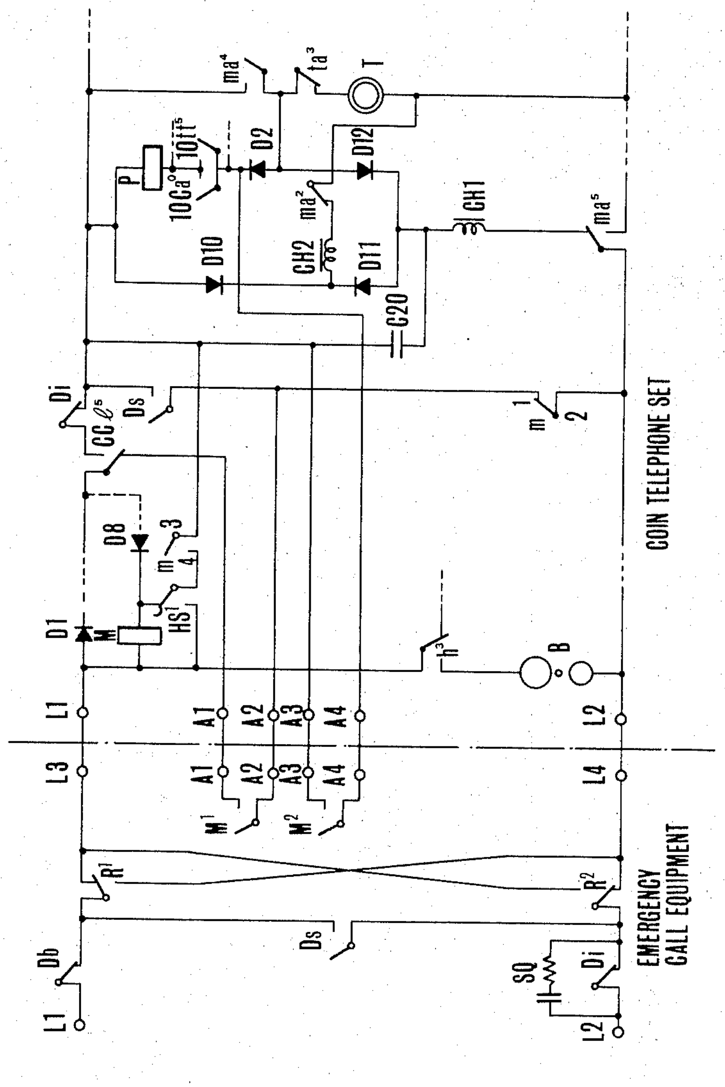
FIG. 7 shows a detailed circuit diagram or the circuit utilized for an emergency call.

The purposes of the emergency call is to enable communications with definite called parties such as police offices and fire-brigade stations irrespective of the energization or deenergization of an AC source of commercial frequency and without the necessity of inserting any coin but by merely taking the handset off the hook and by dialing the emergency call equipment. FIG. 7 illustrates a basic circuit construction necessary for the emergency call. As an example, the operation of the circuit during power-off of the AC source is given hereunder. Even when the handset of the novel coin telephone set is taken off the hook various relays and electromagnets and not operated. Under these conditions, when the emergency call equipment is dialed, a dial impulse is sent to the emergency call equipment through the following circuit.

Terminal L1 — contact Db — contact Ds — contact Di — terminal 12

The emergency call can be made without paying any rate so that even when the circuuit is completed and the called party responds no called party off-hook signal will be transmitted from the central office equipment and the polarity of terminal L1 is maintained positive and that of terminal L2 negative. For this reason, after sending out the dial impulse to the emergency call equipment and after resetting of contact Ds, contacts $R^1$, $R^2$ $M^1$ and $M^2$ in the emergency call equipment are operated by suitable mechanical means not shown. Contact $R^1$ and $R^2$ invert the polarity of the speech circuit to the telephone set for operating the called party off-hook supervisory relay M in the telephone circuit by the following circuit.

emergency call equipment
Terminal L1—contact Db—contact $R^1$—terminal L4
—terminal L2—contact $m^{1.2}$—terminal A2
emergency call equipment
—terminal A2—contact $M^1$—terminal A1—terminal A1
—contact $ccl^5$—diode D8—relay M
emergency call equipment
—terminal L1—terminal L3—contact $R^2$—contact Di—terminal Once energized, relay M is magnetically held in the operated state and during operation of contacts $R^1$, $R^2$, $M^1$ and $M^2$ in the emergency call equipment (that is during reversal of the polarity of the speech circuit) a loop circuit to the central office equipment is established as follows.

emergency call equipment
Terminal L1—contact Db—contact $R^1$—terminal L4
—terminal L2—contact $ma^5$—choke coil CH1—diode D11
—choke coil CH2—contact $ma^2$—transmitter T—contact $ta^3$
—diode D2—terminal A4
emergency call equipment
—terminal A4—contact $M^2$—terminal A3—terminal A3
—contact $m^{3.4}$—contact $HS^1$—terminal L1
emergency call equipment
—Terminal L3—contact $R^2$—contact Di—terminal L2

After a definite time interval, contacts $R^1$, $R^2$, $M^1$ and $M^2$ in the emergency call equipment are reset. Contacts $R^1$ and $R^2$ restores the original polarity of the speech circuit to the telephone set thereby establishing following speech circuit.

emergency call equipment
Terminal L1—contact Db—contact $R^1$—terminal L3
—terminal L1—contact $HS^1$—contact $m^{3.4}$—diode D10
—choke coil CH2—contact $ma^2$—transmitter T—contact $ta^3$
—diode D12—choke coil CH1—contact $ma^5$—terminal L2
emergency call equipment
—terminal L4—contact $R^2$—contact Di—terminal L2

When the calling party replaces his handset, on the hook, current flows through the called party off-hook supervisory relay M of the telephone set in a direction to demagnetize it thus immediately resetting the relay M and hence the telephone set in the same manner as in the case of the local call.

Although the invention has been shown and described in terms of a preferred embodiment thereof, it should be understood that the invention is by no means limited to the particular embodiment illustrated and that many changes and modifications may be made without departing from the true spirit and scope of the invention as defined in the appended claims.

What is claimed is:

1. In a coin operated telephone, set of the type utilizing polarity reversal of speech current sent from a central office equipment and a source of supply potential for enabling a local call, a direct dialing long distance call, an operator-handled toll call, a delayed call and an emergency call, the improvement which comprises means providing at least two independent coin receiving slots and coin passages for the use of coins of low value and coins of high value, low value coin discriminating means supplied through said low value coin slot and passage for discriminating low value coins inserted into said telephone set, low value coin storage means supplied from said low value coin discriminating means for storing normal low value coins discriminated by said low value coin discriminating means, means for collecting and returning under selected conditions, low value coins stored in said low value storage means, high value coin discriminating means supplied through said high value coin slot and passage comprising selectively operable electromagnetic detection coil means for discriminating the material composition of high value coins inserted into said telephone set, high value coin storage means supplied from said high value coin discriminating means for storing normal high value coins discriminated by said high value coin discriminating means, means for collecting and returning under selected conditions, high value coins stored in said high value coin storage means, coin detecting means for detecting the presence or absence of coins in said low and high value coin storage means, respectively, said coin detecting means serving to establish speech circuit means when low value and/or hgh value coins are present in either said low or high value coin storage means, coin collect signal receiving means for receiving coin collect signals transmitted from said central office equipment in respne to a called party removing his telephone set from its hook, call discriminating means which discriminates the type of call in accordance with the coin collect signal, and control means responsive to said coin detecting means, said coin collect signal receiving means and said call discrminating means and controlling operation of said low and high value coin collecting and returning means, respectively, for collecting the appropraite fare for a placed call and returning any unused inserted coins.

2. A coin operated telephone set according to claim 1, further including means determining the order of preference for collection between the low value and high value coin collecting operations, respectively, and means for automatically rejecting and returning coins determined to be counterfeit.

3. A coin operated telephone system according to claim 1 wherein the electromagnetic detection coil means is disposed in said high value coin storage means for temporarily subjecting high value coins stored there by said high value coin discriminating means to an electromagnetic field for determining whether they hae a specified impedance in accordance with the known specific impedance characteristic of genuine high value coins, a bridge circuit connecting one end of said electromagnetic coil to one end of a reference coil having a predetermined impedance equal to the specified impedance corresponding to that of genuine high value coins and connecting the other end of said electromagnetic detection coil to the other end of said reference coil through proportionally arm elements, a filter circuit connected to the output of said bridge circuit, an amplifier for amplifying any unbalance output signal from said filter circuit, and a feedback loop feeding the output of said amplifier circuit to said bridge circuit to form an oscillation system, whereby with high value coins of genuine material subjected to said electromagnetic detection coil, the impedance of said electromagnetic detection coil balances that of said reference coil and results in a first operating condition for said oscillation system and upon suitable coins made of different material being subjected to said electromagnetic detection coil an unbalance of the impedances of said electromagnetic detection coil and said reference coil causes a second different operating condition for said oscillation system.

4. A coin operated telephone set according to claim 3 further including filter and rectifying circuit means coupled to said feedback loop whereby the output voltage of said bridge circuit is smoothed and converted into a DC voltage and used for identifying counterfeit coins made of different material from genuine coins, said bridge circuit being provided with the same number of reference coils as there are types of coins to be discriminated as to discriminate normal coins from counterfeit coins of the same dimension and of different material, and means for selecting appropriate ones of said reference coils.

5. A coin operated telephone set according to claim 1, wherein said high value and low vlaue coin collecting and returning control means each includes counting circuit means for counting a periodic coin collect signal representative of one low value coin unit call authorized by said central office equipment, said high value coin counting circuit means serving to collect high value coins, in accordance with the coin collect signal from said central office equipment during a direct distance dialing call when high value coins are inserted and said coin collect signal is used to count said high value coins through said coin collecting and returning control means one by one until the counted value reaches the telephone rate payed in terms of high value coins and which have already been inserted in the coin receiving slot, thereby permitting continuous speech without interruption and additional insertion of coins and said central office equipment is not needed to discriminate the types of collected coins and to send coin collect signals having a period different from or larger than the coin collect signal representative of one low value coin unit call whereby high value coins can be used for extended continuous phone calls without any modification of the conventional central office equipment.

6. A coin operated telephone set according to claim 5, further including preferential collection means determining the order of preference for collection between low value and high value coins stored in said low value coin storage means and high value coin collection operations respectively, high value coins stored in said high value coin storing means, said preferential collection means to collect low value coins followed by collection of high value coins and including means, operative when the collection of high value coins is followed by an additional insertion and storage of a low value coin in said low value storage means, for collecting said additionally inserted and stored low value coin only after the collected high value coins equal the telephone toll paid in terms of high value coins.

7. A coil operated telephone set according to claim 6 wherein said electromagnetic detection coil means for discriminating the material composition of the high value coins is disposed in said high value coin storage means for temporarily subjecting high value coins stored there by said high value coin whether they have a specified impedance in accordance with the known specific impedance characteristic of genuine high value coins, a bridge circuit connecting one end of said electromagnetic coil to one end of a reference coil having a predetermined impedance equal to the specified impedance corresponding to that of genuine high value coins and connecting the other end of said electromagnetic detection coil to the other end of said reference coil through proportionality arm elements, a filter circuit connected to the output of said bridge circuit, an amplifier for amplifying any unbalance output signal from said filter circuit, and a feedback loop feeding the output of said amplifier circuit to said bridge circuit to form an oscillation system, whereby with high value coins of genuine material subjected to said electromagnetic detection coil the impedance of said electromagnetic detection coil balances that of said reference coil and results in minimal output voltage from said bridge circuit and a non-oscillation condition for said feedback loop, and upon unsuitable coins made of different material being subjected to said electromagnetic detection coil, an unbalance of the impedances of said electromagnetic detection coil and said reference coil causes increased output voltage from said bridge circuit resulting in an oscillation condition of said feedback loop.

8. A coin operated telephone set according to claim 7, further including filter and rectifying circuit means coupled to said feedback loop whereby the output voltage of said bridge circuit is smoothed and converted into a DC voltage and used for identifying counterfeit coins made of different material from genuine coins, said bridge circuit being provided with the same number of reference coils as there are types of coins to be discriminated so as to discriminate normal coins from counterfeit coins of the same dimension and of different material, and means for selecting appropriate ones of said reference coils.

9. A coin operated telephone set according to claim 1 wherein said call discriminating means includes first discriminating circuit means and second discriminating circuit means, said first discriminating circuit means discriminating between a direct distance dialing call and other calls in accordance with the coil collect signal sent from said central office equipment, said second discriminating circuit means discriminating a terminating call in accordance with a call signal of known frequency sent from said central office equipment, and said coin collecting and returning means is responsive to said first and second discriminating means when the direct distance dialing call is discriminated from other calls by said first discriminating circuit and the terminating call is discriminated by said second discriminating circuit to store inserted coins in a coin receptacle directly without storage in said low value coin storage means and high value coin storage means.

* * * * *